United States Patent
Ito et al.

(10) Patent No.: US 8,000,516 B2
(45) Date of Patent: Aug. 16, 2011

(54) MANUFACTURING METHOD OF PLUGGED HONEYCOMB STRUCTURE

(75) Inventors: Koichi Ito, Nagoya (JP); Takeshi Tokunaga, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 915 days.

(21) Appl. No.: 11/954,394

(22) Filed: Dec. 12, 2007

(65) Prior Publication Data

US 2008/0157441 A1 Jul. 3, 2008

(30) Foreign Application Priority Data

Dec. 28, 2006 (JP) ................................ 2006-353675

(51) Int. Cl.
*G06K 9/00* (2006.01)
(52) U.S. Cl. ........ 382/141; 382/225; 382/133; 382/181; 428/116; 264/482; 264/254; 264/319
(58) Field of Classification Search .................. 382/141, 382/225, 133, 181; 264/482, 254, 319; 428/116
See application file for complete search history.

(56) References Cited

U.S. PATENT DOCUMENTS

| | | | | |
|---|---|---|---|---|
| 4,094,717 A | * | 6/1978 | Barr | 156/197 |
| 4,791,910 A | * | 12/1988 | Ishida et al. | 126/570 |
| 2004/0137194 A1 | * | 7/2004 | Fukao et al. | 428/116 |

FOREIGN PATENT DOCUMENTS

| | | |
|---|---|---|
| JP | A 10-337427 | 12/1998 |
| JP | A 2001-300922 | 10/2001 |
| JP | A 2003-200010 | 7/2003 |

OTHER PUBLICATIONS

New U.S. Application filed Dec. 11, 2007 by Ito et al.

* cited by examiner

*Primary Examiner* — Matthew Bella
*Assistant Examiner* — Mike Rahmjoo
(74) *Attorney, Agent, or Firm* — Oliff & Berridge, PLC

(57) ABSTRACT

A manufacturing method of a plugged honeycomb structure including attaching a transparent sheet to an end face of a honeycomb structure; picking up an image of the end face; with respect to cells positioned at other than outermost peripheral portion of a honeycomb structure (usual cells), subjecting the picked-up image to image processing, recognizing positions to be plugged on said sheet, and with respect to cells positioned at outermost peripheral portion (outermost peripheral cells), positions of the cells are recognized based on an average cell pitch calculated from the positions of the cells, subjecting to a perforation treatment based on the recognized positions of the sheet, submerging an end portion into a plugging slurry in which a material of the plugging portions is slurried, filling holes made at the respective sheet with the slurry to form the plugging portions.

2 Claims, 3 Drawing Sheets

MANUFACTURING METHOD OF PLUGGED HONEYCOMB STRUCTURE

BACKGROUND OF THE INVENTION

1. Field of the Invention

The present invention relates to a manufacturing method of a honeycomb structure for use in a diesel particulate filter (DPF) and the like, in which one end portion of each cell is plugged.

2. Description of the Related Art

An exhaust gas discharged from an internal combustion engine such as a diesel engine includes a large amount of particulates (particulate substances) containing, as a main component, carbon which is a cause for environmental pollution, and hence a filter for trapping (filtering) the particulates is generally mounted on an exhaust system of the engine.

Usually, in the filter for use in such a purpose, there is used a plugged honeycomb structure 1 including, as shown in FIGS. 2(a) and (b), a honeycomb structure 2 in which a plurality of cells 9 are separated by porous partition walls 7 and formed so as to communicate with two end faces, and plugging portions 11 arranged in complementary checkered patterns on one end face side and the other end face side of the honeycomb structure 2 so as to plug one of two opening ends of each of the cells 9.

After the exhaust gas flows into the filter including such a plugged honeycomb structure from one end face 3 of the filter and the particulates and the like included in the gas are removed from the gas, the gas flows out of the other end face 5. Specifically, the exhaust gas first flows into cells 9b having end portions which are not closed at the one end face 3 of this filter and having closed end portions at the other end face 5, passes through the porous partition walls 7, moves to cells 9a having closed end portions at the one end face 3 and end portions which are not closed at the other end face 5, and is discharged from these cells 9a. Then, in this case, the partition walls 7 function as filter layers, and the particulates in the gas are trapped by the partition walls 7 and deposited on the partition walls 7.

As a manufacturing method of the above plugged honeycomb structure, a method is known in which a transparent sheet or the like is attached to an end face of a formed honeycomb body, an image of the end face is picked up, then the picked-up image is subjected to image processing to recognize positions of the cells, positions of the sheet corresponding to the cells to be plugged are subjected a perforation treatment by laser processing or the like based on the recognized positions, then an end portion of the honeycomb structure is submerged into a plugging slurry including a slurried material of plugging portions, and end portions of the cells to be plugged are filled with the plugging slurry from holes made by the perforation treatment in the sheets (e.g., see Patent Document 1).

In this manufacturing method, as described above, the positions of the cells are recognized by the image recognition. Specifically, the image of the end face of the honeycomb structure picked up by a charge-coupled device (CCD) camera or the like is binarized. When a lump of black images in the binarized image have a predetermined cell shape (e.g., a quadrangular shape), or reaches a certain ratio (e.g., 80% or more) of a predetermined cell area, the images are regarded as the cells, and the positions of the cells are recognized. It is to be noted that images which do not have the predetermined cell shape and which do not reach the certain ratio of the predetermined cell area are regarded as foreign matters such as dust attached to the end face of the honeycomb structure, and the positions are not subjected to the perforation treatment by mistake.

However, among the cells, the cells positioned at an outermost peripheral portion of the honeycomb structure (cells which come in contact with an outer peripheral wall of the honeycomb structure) have a partially chipped shape as compared with the other cells, and areas of the cells are reduced. Therefore, in the above image processing, positions of the cells are not recognized as the cells in many cases. Even when the cells should originally be plugged, the positions of the sheet corresponding to the cells are not subjected to the perforation treatment, and the cells are not filled with the plugging slurry. As a result, any plugging portion is not formed, and cells having both end portions which remain to be opened are left.

In such cells having both the end portions which remain to be opened, a large part of the particulates in the exhaust gas which has flowed into the cells is not trapped, and passes through the honeycomb structure. Therefore, the presence of such cells is a factor for deterioration of a performance of the filter.

[Patent Document 1] Japanese Patent Application Laid-Open No. 2001-300922

SUMMARY OF THE INVENTION

The present invention has been developed in view of such problems of the conventional technology, and an object thereof is to provide a manufacturing method of a plugged honeycomb structure in which positions of cells positioned at an outermost peripheral portion of a honeycomb structure can be recognized so that plugging portions can be formed even at such cells.

To achieve the above object, according to the present invention, there is provided the following manufacturing method of the plugged honeycomb structure.

[1] A manufacturing method of a plugged honeycomb structure in which a plurality of cells are separated by porous partition walls and formed so as to communicate with two end faces of the honeycomb structure, and plugging portions arranged so as to plug one of two opening ends of each of the cells, the method comprising attaching a transparent sheet to an end face of the honeycomb structure, picking up an image of the end face, then, with respect to cells other than cells positioned at an outermost peripheral portion of the honeycomb structure, recognizing positions of the cells other than cells positioned at an outermost peripheral portion of the honeycomb structure on the sheet by subjecting the picked-up image to image processing, and with respect to cells positioned at the outermost peripheral portion of the honeycomb structure, recognizing positions of the cells positioned at the outermost peripheral portion of the honeycomb structure on the sheet by calculating positions of the cells positioned at the outermost peripheral portion of the honeycomb structure from an average cell pitch calculated from the positions of the cells other than the cells positioned at the outermost peripheral portion of the honeycomb structure recognized by said image processing. After recognition of the position of cells to be plugged, subjecting the positions of the sheet corresponding to the cells to be plugged to a perforation treatment based on the recognized positions, submerging one of opening ends of the honeycomb structure into a plugging slurry in which a material of the plugging portions is slurried, and filling end portions of the cells to be plugged with the plugging slurry through holes made by the perforation treatment in the sheet to form the plugging portions.

[2] The manufacturing method of the plugged honeycomb structure according to the above [1], wherein the perforation treatment is performed using laser.

According to the manufacturing method of the present invention, the positions of the cells positioned at the outermost peripheral portion of the honeycomb structure, which have not been easily recognized by image processing, can be recognized, and the plugging portions can substantially securely be formed even at the cells. Therefore, in the plugged honeycomb structure manufactured by the manufacturing method of the present invention, even particulates in a gas which has flowed into the cells positioned at the outermost peripheral portion can be trapped, and the structure exhibits an excellent performance of a filter.

EXPLANATION OF NUMERALS IN THE DRAWINGS

1 . . . a plugged honeycomb structure, 2 . . . a honeycomb structure, 3 . . . one end face, 5 . . . another end face, 6 . . . outer wall, 7 . . . a partition wall, 9 . . . cells, 11 . . . a plugged portion,

DESCRIPTION OF THE PREFERRED EMBODIMENT

A typical embodiment of the present invention will hereinafter specifically be described, but it should be understood that the present invention is not limited to the following embodiment and that appropriate design modification, improvement and the like are added to the following embodiment based on ordinary knowledge of a person skilled in the art fall within the scope of the present invention. It is to be noted that a "honeycomb structure" simply mentioned in the present specification is a honeycomb structure which does not have any plugging portion.

Figure 1:
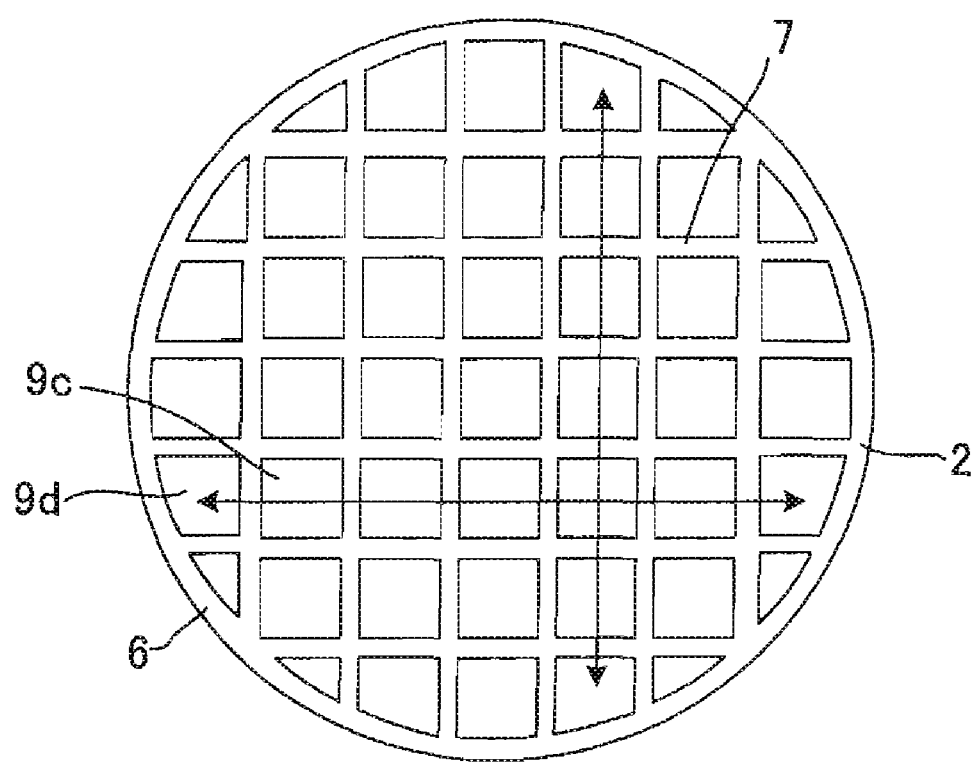
FIG. 1 is a schematic plan view showing an end face of a honeycomb structure.

FIG. 1 is a schematic plan view showing an end face of a honeycomb structure. The present invention is a manufacturing method of a plugged honeycomb structure in which a plurality of cells are separated by porous partition walls and formed so as to communicate with two end races of the honeycomb structure, and plugging portions arranged so as to plug one of two opening ends of each of the cells. In the honeycomb structure for use in an application of a filter or the like, one of the two opening ends of each cell needs to be plugged, and for this purpose, positions of the cells on the end face of the honeycomb structure need to be first recognized. In the present invention, the positions of the cells are recognized by methods which are different with cells positioned at an outermost peripheral portion of the honeycomb structure (hereinafter referred to as the "outermost peripheral cells") and cells other than the outermost peripheral cells (hereinafter referred to as the "usual cells").

That is, with regard to usual cells 9c, a transparent sheet (not shown) is attached to an end face of a honeycomb structure 2, an image of the end face is picked up, and then the picked-up image is subjected to image processing to recognize a position of the image. A commercially available adhesive sheet may be used in the sheet. There is not any special restriction on an image pickup unit for picking up the image of the end face of the honeycomb structure 2, but a CCD camera, an X-ray computed tomography (CT) scanner or the like may preferably be used. As the CCD camera, for example, a highly precise CCD cell manufactured by Keyence Corporation or the like may preferably be used. The "image processing" mentioned herein specifically means "binarization processing". In the "binarization processing", data is divided into colors of, for example, 256 gradations, a threshold value is regarded as a boundary, and the image is converted into a monochromatic binary image in which a portion having a luminance higher than the threshold value is white, and a portion having a luminance lower than the threshold value is black. In consequence, a partition wall portion (white) and a cell portion (black) of the honeycomb structure can be distinguished.

In the image of the end face of the honeycomb structure subjected to the image processing in this manner, in a case where a lump of black images forms a predetermined cell shape (e.g., a quadrangular shape), or reaches a certain ratio (e.g., 80% or more) of a predetermined cell area, the images are regarded as the cells, and positions of the cells are recognized. Outermost peripheral cells 9d come in contact with an outer peripheral wall 6, whereby a part of an original cell shape is chipped. On the other hand, even when the usual cells 9c are slightly deformed in the process of manufacturing of the honeycomb structure, the cells retain substantially original cell shape and area, so that the cells are substantially securely regarded as cells by such image processing. After recognizing positions of the usual cells 9c on the end face of the honeycomb structure 2 in this manner, positions of the sheet attached to the end face corresponding to the cells to be plugged are subjected to a perforation treatment.

It is to be noted that to pick up the image of the end face of the honeycomb structure 2, from a viewpoint that wrong recognition of the cells and foreign matters is avoided during cell recognition after the image processing, it is preferable to beforehand remove foreign matters such as dust attached to the end face by blowing of air or the like, before attaching the sheet to the end face. From a similar viewpoint, in the lump of images in the image subjected to the image processing, an image in which the number of pixels constituting the image is a predetermined pixel number or less may be regarded as foreign matters such as the dust, and eliminated from a judgment target.

On the other hand, the outermost peripheral cells 9d come in contact with the outer peripheral wall 6 of the honeycomb structure 2 as described above, whereby a part of the original cell shape is chipped, and it is therefore difficult to recognize the cells by the image processing. To solve the problem, in the present invention, an average cell pitch is calculated from the positions of the usual cells 9c recognized by the image processing, and the positions of the outermost peripheral cells 9d are recognized from the calculation of the average cell pitch. Specifically, in cell arrangement directions shown by arrows in FIG. 1, positions moved as much as the average cell pitch from the cells present on an outermost peripheral side of the usual cells 9c (the usual cells adjacent to the outermost peripheral cells) toward an outer periphery of the honeycomb structure 2 are recognized as positions of the outermost peripheral cells 9d. After recognizing the positions of the outermost peripheral cells 9d on the end face of the honeycomb structure 2 in this manner, the positions of the sheet attached to the end face corresponding to the cells to be plugged are subjected to the perforation treatment based on the recognized positions.

It is to be noted that as a method of recognizing the positions of the outermost peripheral cells, in addition to the above method of the present invention, for example, a method is considered in which the positions are calculated from a theoretical value of a design drawing of the honeycomb structure, but in a case where the cells are undulated in the process of the manufacturing of the honeycomb structure, a deviation from a designed value is generated, and holes are not made at appropriate positions. In the present invention, since the positions of the outermost peripheral cells are specified using the average cell pitch calculated from actual positions of the usual cells, a deviation is not easily generated between the positions of the outermost peripheral cells and perforated positions.

In the present invention, there is not any special restriction on a method of the perforation treatment of the sheet, but from viewpoints of a treatment speed, accuracy and ease of automation, it is preferable to perform the perforation treatment by use of laser. For example, an XYZθ-stage on which the honeycomb structure is disposed is positioned, and the positions of the sheet corresponding to the cells to be plugged are irradiated with the laser to perform the perforation treatment. It is to be noted that the whole end face may be subjected to the perforation treatment once, or the end face may be divided into a plurality of small blocks to subject each of the small blocks to the treatment. It is preferable that an area of each hole to be made in the sheet is about 30 to 70% of a cell area, and it is preferable that when a slurry for use in plugging has a low viscosity, the area of the hole is set to be small. When the viscosity is high, it is preferable that the area is set to be large.

Figure 2A:
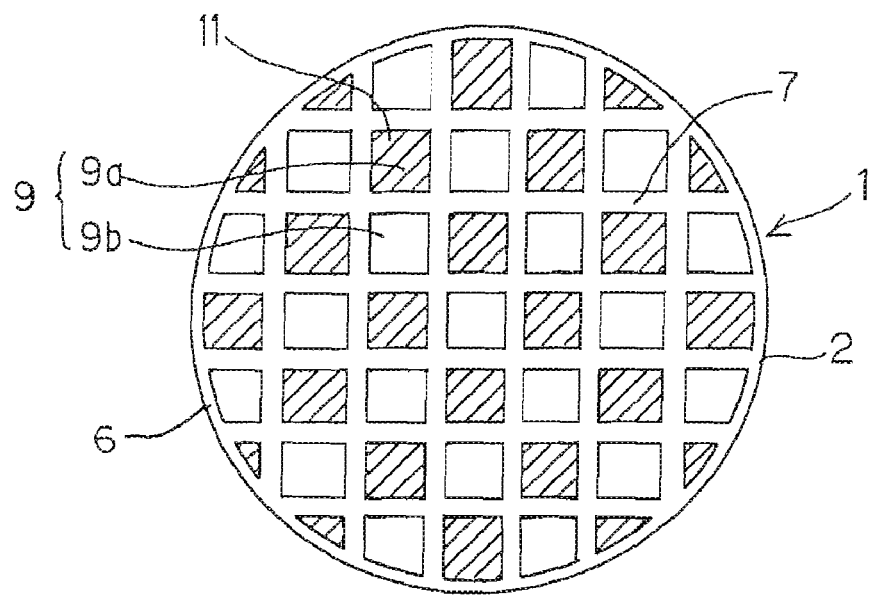
FIG. 2 is a schematic diagram showing a basic structure of a plugged honeycomb structure, (a) is a schematic plan view as viewed from one end face side, and (b) is a schematic sectional view.
Figure 2B:
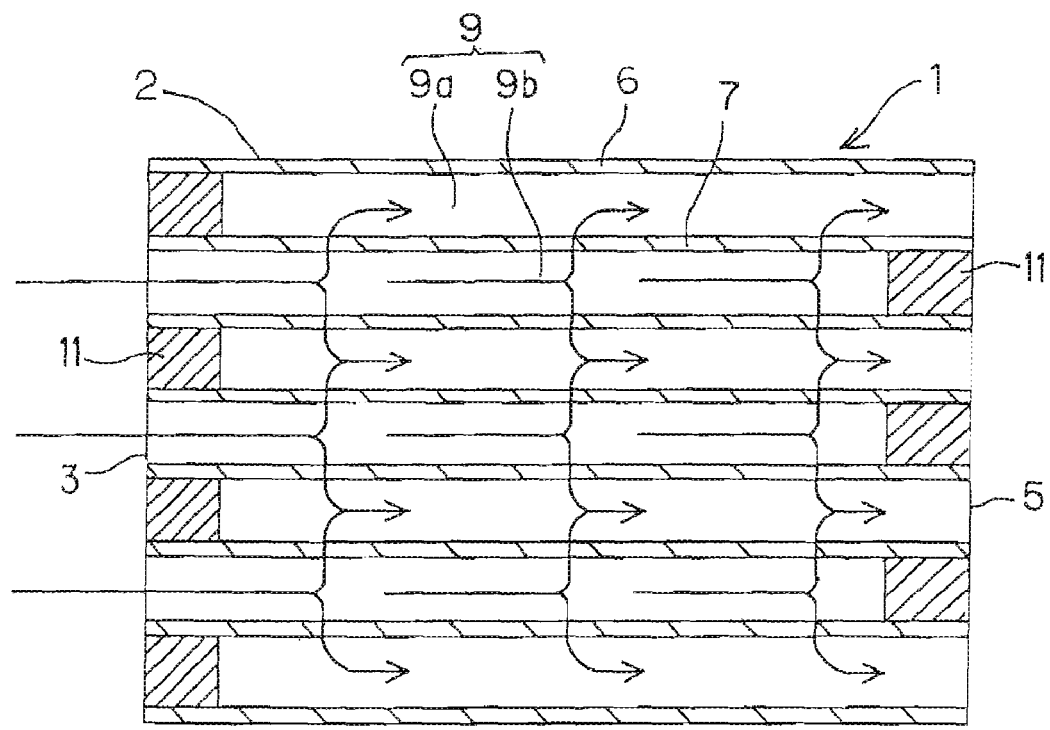

After subjecting the sheet to the perforation treatment in this manner, an end portion of the honeycomb structure to which the sheet has been attached is submerged into the plugging slurry in which a material of the plugging portions is slurried, and end portions of the cells to be plugged are filled with the plugging slurry through the holes made by the perforation treatment in the sheet, to form the plugging portions. Afterward, if necessary, the honeycomb structure is dried and/or fired to obtain the plugged honeycomb structure. There is not any special restriction on the positions of the cells to be plugged, that is, a plugging pattern. However, when the plugged honeycomb structure is used in an application of a filter such as DPF, as shown in FIG. 2, it is general to arrange the plugging portions 11 in complementary checkered patterns on one end face 3 side and the other end face 5 side of the honeycomb structure 2 as shown in FIG. 2.

It is to be noted that a state of the honeycomb structure at a time when the end portions of the cells are filled with the plugging slurry may be a state of a sintered body already fired or a state of a formed body before fired. In the state of the formed body, after filling the end portions of the cells with the plugging slurry, the whole honeycomb structure needs to be fired.

There is not any special restriction on a material constituting the honeycomb structure, but since the partition walls need to have a porous state after fired, a material made of a ceramic (e.g., cordierite or the like) is preferably used. There is not any special restriction on a shape of the honeycomb structure, and various shapes such as a cylindrical shape, a square pole-like shape and a triangular pole-like shape may be employed. The most general cell shape of the honeycomb structure is a quadrangular shape, but a polygonal shape such as a triangular shape, a hexagonal shape or an octagonal shape, a round shape or a combination of these shapes may be used.

In a case where the plugged honeycomb structure is used as a filter such as the DPF, the honeycomb structure has a partition wall thickness of preferably 100 to 2000 μm, more preferably 200 to 1000 μm, further preferably 300 to 700 μm. If the thickness of the partition walls is less than 100 μm, strength falls short, and resistance to thermal shock sometimes deteriorates. On the other hand, if the thickness of the partition walls exceeds 2000 μm, a pressure loss tends to increase.

A cell density of the honeycomb structure is preferably 20 to 600 cells/in$^2$ (cpsi), more preferably 50 to 400 cpsi, further preferably 100 to 300 cpsi. When the cell density is less than 20 cpsi, contact efficiency with the exhaust gas tends to fall short. On the other hand, if the cell density exceeds 600 cpsi, the pressure loss tends to increase. It is to be noted that "cpsi" is an abbreviation of "cells per square inch", and a unit indicating the number of cells per square inch. For example, 10 cpsi is about 1.55 cells/cm$^2$.

A porosity of the honeycomb structure is preferably 30 to 90%, more preferably 45 to 80%, especially preferably 50 to 70%. The porosity is set to 30 to 90%, so that the pressure loss is reduced, and further mechanical strength of the structure can be retained.

An average pore diameter (slit diameter) of the honeycomb structure is preferably 5 to 500 μm. If the average pore diameter is less than 5 μm, the pressure loss tends to rise. On the other hand, if the average pore diameter exceeds 500 μm, trapping efficiency of the honeycomb structure used in the filter tends to deteriorate.

There is not any special restriction on a manufacturing method of such a honeycomb structure, but the honeycomb structure may be manufactured by, for example, a heretofore known manufacturing method in which a ceramic clay having an appropriately regulated viscosity is extruded using a die having a desired cell shape, a desired partition wall thickness and a desired cell density, to dry and/or fire the resultant formed body.

The plugging slurry can be prepared by mixing, for example, ceramic powder and a dispersion medium (e.g., water or the like). Furthermore, if necessary, an additive such as a binding agent, a deflocculant or a foaming resin may be added to the slurry. There is not any special restriction on a material of the ceramic powder, but it is preferable to use the same material as that of the honeycomb structure. As the binding agent, polyvinyl alcohol, methyl cellulose or the like may preferably be used.

EXAMPLES

The present invention will hereinafter be described in accordance with examples in more detail, but the present invention is not limited to these examples.

Example 1

Figure 3:
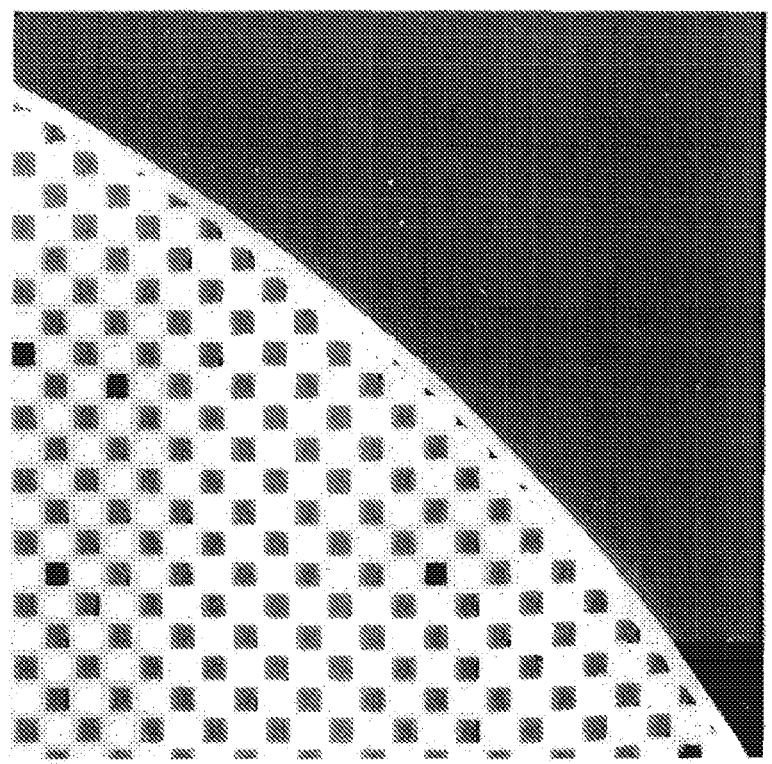
FIG. 3 is a photograph in which a portion of an end face of a honeycomb structure provided with plugging portions is photographed in Example 1.

A commercially available transparent adhesive sheet was attached to an end face of a porous honeycomb structure (a length: 150 mm, an outer diameter: 140 mm, a partition wall thickness: 400 μm, a cell shape: square, a cell density: 300 cpsi, a designed cell pitch: 1.5 μm), then an image of the end face was picked up with a CCD camera, and the picked-up image was subjected to image processing (binarization processing). When a lump of black images in the processed image reached 80% or more of a predetermined designed cell area, the images were regarded as usual cells, and positions of the cells were recognized. It is to be noted that an image resolution of the image processing was set to 0.1 mm/pixel. An average cell pitch was calculated from the usual cells having the recognized positions, and positions moved as much as the average cell pitch from cells present on an outermost peripheral side of the usual cells to an outer periphery of the honeycomb structure in a cell arrangement direction were recognized as positions of outermost peripheral cells. After the positions of the usual cells and the outermost peripheral cells were recognized on the end face of the honeycomb structure in this manner, an XYZθ-stage on which the honeycomb structure was disposed was positioned, and positions of the sheet corresponding to the cells to be plugged were irradiated with laser to perform a perforation treatment. The cells to be plugged were present at every other cell so that the plugged end face has a checkered pattern. After the perforation treatment, a ratio of the positions of the sheet actually subjected to the perforation treatment among the positions of the sheet corresponding to the outermost peripheral cells to be plugged was obtained. The results are shown in Table 1. In a state in which the sheet was attached to the end face of the honeycomb structure, an end portion of the honeycomb structure was submerged into a plugging slurry (in which the same material as that of the honeycomb structure is slurried), and end portions of the cells to be plugged with the plugging slurry, to form plugging portions. Afterward, a plugged state of the outermost peripheral cells was checked, and among the outermost peripheral cells to be plugged, with regard to large cells having an area ratio of 50% or more with respect to the usual cells and small cells having an area ratio less than 50% with respect to the usual cells, the number of the cells at which any plugging portion was not formed was obtained. The results are shown in Table 1. An image of a part of the end face of the honeycomb structure provided with the plugging portions was picked up. The photograph is shown in FIG. 3.

Example 2

Positions of usual cells and outermost peripheral cells were recognized, an adhesive sheet was subjected to a perforation treatment, and plugging portions were formed in the same manner as in Example 1 except that foreign matters such as dust were removed by blowing air to an end face of a honeycomb structure before attaching the adhesive sheet to the end face of the honeycomb structure. In the same manner as in Example 1, among positions of the sheet corresponding to the outermost peripheral cells to be plugged, a ratio of the positions actually subjected to the perforation treatment was obtained, and the number of the cells at which any plugging portion was not formed was obtained. The results are shown in Table 1.

Example 3

Positions of usual cells and outermost peripheral cells were recognized, a sheet was subjected to a perforation treatment, and plugging portions were formed in the same manner as in Example 2 except that during recognition of the cells by image processing, in one lump of images in a processed image, an image in which the number of pixels constituting the image was five or less was regarded as foreign matters such as dust, and eliminated from a judgment target. In the same manner as in Example 1, among positions of the sheet corresponding to the outermost peripheral cells to be plugged, a ratio of the positions actually subjected to the perforation treatment was obtained, and the number of the cells at which any plugging portion was not formed was obtained. The results are shown in Table 1.

Example 4

Positions of usual cells and outermost peripheral cells were recognized, a sheet was subjected to a perforation treatment, and plugging portions were formed in the same manner as in Example 2 except that an image resolution of image processing was set to 0.2 mm/pixel. In the same manner as in Example 1, among positions of the sheet corresponding to the outermost peripheral cells to be plugged, a ratio of the positions actually subjected to the perforation treatment was obtained, and the number of the cells at which any plugging portion was not formed was obtained. The results are shown in Table 1.

Comparative Example 1

Figure 4:
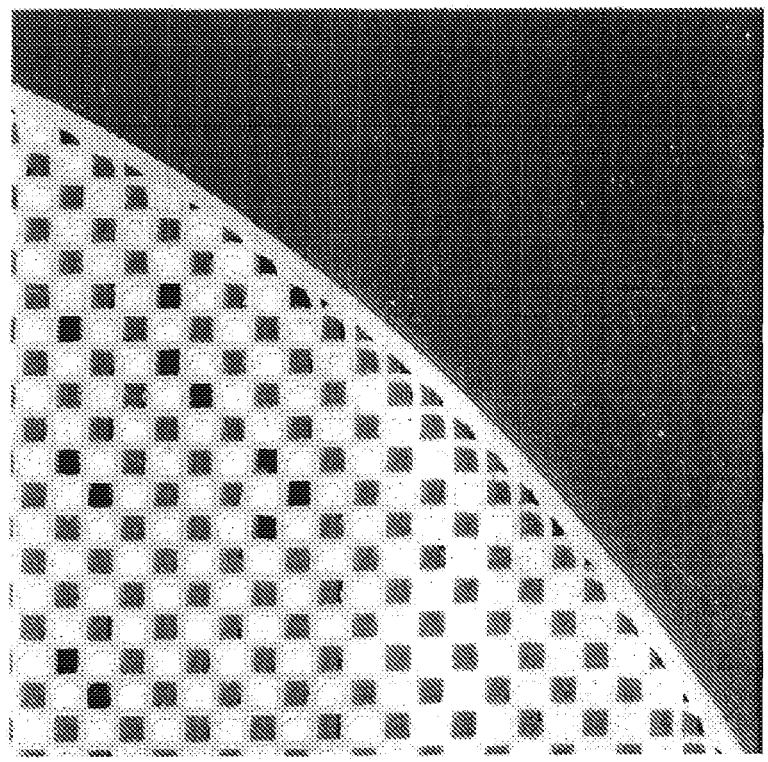
FIG. 4 is a photograph in which a portion of an end face of a honeycomb structure provided with plugging portions is photographed in Comparative Example 1.

A sheet was subjected to a perforation treatment, and plugging portions were formed in the same manner as in Example 1 except that during recognition of positions of outermost peripheral cells, any special method was not used, and all the cells were recognized by image processing. In the same manner as in Example 1, among positions of the sheet corresponding to the outermost peripheral cells to be plugged, a ratio of the positions actually subjected to the perforation treatment was obtained, and the number of the cells at which any plugging portion was not formed was obtained. The results are shown in Table 1. A part of an end face of a honeycomb structure provided with the plugging portions was photographed. The photograph is shown in FIG. 4.

Comparative Example 2

Positions of cells were recognized, a sheet was subjected to a perforation treatment, and plugging portions were formed in the same manner as in Comparative Example 1 except that air was blown to an end face of a honeycomb structure to remove foreign matters such as dust, before attaching an adhesive sheet to the end face of the honeycomb structure. In the same manner as in Example 1, among positions of a sheet corresponding to outermost peripheral cells to be plugged, a ratio of the positions actually subjected to the perforation treatment was obtained, and the number of the cells at which any plugging portion was not formed was obtained. The results are shown in Table 1.

Comparative Example 3

Positions of cells were recognized, a sheet was subjected to a perforation treatment, and plugging portions were formed in the same manner as in Comparative Example 2 except that during recognition of the cells by image processing, in one lump of images in a processed image, an image in which the number of pixels constituting the image was five or less was regarded as foreign matters such as dust, and eliminated from a judgment target. In the same manner as in Example 1, among positions of the sheet corresponding to outermost peripheral cells to be plugged, a ratio of the positions actually subjected to the perforation treatment was obtained, and the number of the cells at which any plugging portion was not formed was obtained. The results are shown in Table 1.

Comparative Example 4

Positions of cells were recognized, a sheet was subjected to a perforation treatment, and plugging portions were formed in the same manner as in Comparative Example 2 except that during recognition of the cells by image processing, in one lump of images in a processed image, an image in which the number of pixels constituting the image was ten or less was regarded as foreign matters such as dust, and eliminated from a judgment target. In the same manner as in Example 1, among positions of the sheet corresponding to outermost peripheral cells to be plugged, a ratio of the positions actually subjected to the perforation treatment was obtained, and the number of the cells at which any plugging portion was not formed was obtained. The results are shown in Table 1.

Comparative Example 5

A sheet was subjected to a perforation treatment, and plugging portions were formed in the same manner as in Comparative Example 2 except that positions of outermost peripheral cells were calculated from a theoretical value of a design drawing and recognized. In the same manner as in Example 1, among positions of the sheet corresponding to the outermost peripheral cells to be plugged, a ratio of the positions actually subjected to the perforation treatment was obtained, and the number of the cells at which any plugging portion was not formed was obtained. The results are shown in Table 1.

Comparative Example 6

Positions of cells were recognized, a sheet was subjected to a perforation treatment, and plugging portions were formed in the same manner as in Comparative Example 2 except that an image resolution of image processing was set to 0.2 mm/pixel. In the same manner as in Example 1, among positions of the sheet corresponding to outermost peripheral cells to be plugged, a ratio of the positions actually subjected to the perforation treatment was obtained, and the number of the cells at which any plugging portion was not formed was obtained. The results are shown in Table 1.

Comparative Example 7

Positions of cells were recognized, a sheet was subjected to a perforation treatment, and plugging portions were formed in the same manner as in Comparative Example 3 except that an image resolution of image processing was set to 0.2 mm/pixel. In the same manner as in Example 1, among positions of the sheet corresponding to outermost peripheral cells to be plugged, a ratio of the positions actually subjected to the perforation treatment was obtained, and the number of the cells at which any plugging portion was not formed was obtained. The results are shown in Table 1.

Comparative Example 8

Positions of cells were recognized, a sheet was subjected to a perforation treatment, and plugging portions were formed in the same manner as in Comparative Example 2 except that an image resolution of image processing was set to 0.5 mm/pixel. In the same manner as in Example 1, among positions of the sheet corresponding to outermost peripheral cells to be plugged, a ratio of the positions actually subjected to the perforation treatment was obtained, and the number of the cells at which any plugging portion was not formed was obtained. The results are shown in Table 1.

TABLE 1

| | Recognition method of outermost peripheral cells | Image resolution (mm/pixel) | Number of dust removed (pixels) | Presence of pretreatment (removal of dust by air) | Plugged state of outermost peripheral cells[*1] Large cells[*2] | Plugged state of outermost peripheral cells[*1] Small cells[*3] | A ratio of the positions actually perforated in the sheet among those of outermost peripheral cells to be plugged[*4] (%) |
|---|---|---|---|---|---|---|---|
| Example 1 | Calculate from average cell pitch of usual cells | 0.1 | 0 | None | ◎ | ◎ | 100 |
| Example 2 | Calculate from average cell pitch of usual cells | 0.1 | 0 | Done | ◎ | ◎ | 100 |
| Example 3 | Calculate from average cell pitch of usual cells | 0.1 | 5 | Done | ◎ | ◎ | 100 |
| Example 4 | Calculate from average cell pitch of usual cells | 0.2 | 0 | Done | ◎ | ◎ | 100 |
| Comparative Example 1 | None (recognize all cells by image processing) | 0.1 | 0 | None | X | X | 45 |
| Comparative Example 2 | None (recognize all cells by image processing) | 0.1 | 0 | Done | Δ | X | 57 |
| Comparative Example 3 | None (recognize all cells by image processing) | 0.1 | 5 | Done | Δ | Δ | 66 |
| Comparative Example 4 | None (recognize all cells by image processing) | 0.1 | 10 | Done | Δ | X | 61 |
| Comparative Example 5 | Calculate from theoretical value of design drawing | 0.1 | 0 | Done | ○ | Δ | 73 |
| Comparative Example 6 | None (recognize all cells by image processing) | 0.2 | 0 | Done | Δ | X | 52 |
| Comparative Example 7 | None (recognize all cells by image processing) | 0.2 | 5 | Done | X | X | 48 |
| Comparative Example 8 | None (recognize all cells by image processing) | 0.5 | 0 | Done | X | X | 34 |

[*1] Among the outermost peripheral cells to be plugged, in a case where the number of the cells at which any plugging portion was not formed was zero, the cells were evaluated as "double circle". In a case where the number of the cells was one to five, the cells were evaluated as "circle". In a case where the number of the cells was six to twenty, the cells were evaluated as "triangle". In a case where the number of the cells exceeded twenty, the cells were evaluated as "cross".
[*2] Among the outermost peripheral cells, cells in which an area ratio with respect to usual cells (cells other than the outermost peripheral cells) was 50% or more
[*3] Among the outermost peripheral cells, cells in which the area ratio with respect to the usual cells (the cells other than the outermost peripheral cells) was less than 50%
[*4] a ratio of the positions in which holes are actually perforated in the sheet among the positions to be perforated corresponding to the outermost peripheral cells to be plugged.

As shown in Table 1, in Examples 1 to 4 in which the positions of the outermost peripheral cells were calculated from the average cell pitch of the usual cells and recognized, all the positions of the sheet corresponding to the outermost peripheral cells to be plugged were subjected to perforation, and the plugging portions were correctly formed at the outermost peripheral cells to be plugged. On the other hand, in Comparative Examples 1 to 4 and 6 to 8 in which any special method was not used in recognizing the positions of the outermost peripheral cells, and all the cells were recognized by the only image processing, among the positions of the sheet corresponding to the outermost peripheral cells to be plugged, only around a half of them was actually subjected to the perforation treatment, and there were a large number of cells at which any plugging portion was not formed. Even in Comparative Example 5 in which the positions of the outermost peripheral cells were calculated from the theoretical value of the design drawing and recognized, only about 70% of the positions of the sheet corresponding to the peripheral cells to be plugged was actually subjected to the perforation treatment, and there were a large number of cells at which any plugging portion was not formed.

The present invention can preferably be used as a manufacturing method of a plugged honeycomb structure for use in a filter such as a DPF for filtering particulate substances.

What is claimed is:

1. A manufacturing method of a plugged honeycomb structure in which a plurality of cells are separated by porous partition walls and formed so as to communicate with two end faces of the honeycomb structure, and plugging portions are arranged so as to plug one of two opening ends of each of the cells, the method comprising:

attaching a transparent sheet to an end face of an end portion of the honeycomb structure;

picking up an image of the end face;

with respect to cells other than cells positioned at an outermost peripheral portion of the honeycomb structure, recognizing positions of the cells other than cells positioned at an outermost peripheral portion of the honeycomb structure on the sheet by subjecting the picked-up image to image processing using an image processor;

with respect to cells positioned at the outermost peripheral portion of the honeycomb structure, recognizing positions of the cells positioned at the outermost peripheral portion of the honeycomb structure on the sheet by calculating positions of the cells positioned at the outermost peripheral portion from an average cell pitch calculated from the positions of the cells other than the cells positioned at the outermost peripheral portion of the honeycomb structure recognized by said image processing;

subjecting positions of the sheet corresponding to cells to be plugged to a perforation treatment based on the recognized positions of the cells other than cells positioned at the outermost peripheral portion of the honeycomb structure and the recognized positions of the cells positioned at the outermost peripheral portion of the honeycomb structure;

submerging the end portion of the honeycomb structure into a plugging slurry in which a material of the plugging portions is slurried for selected plugging portions; and filling end portions of the cells to be plugged at the end portion of the honeycomb structure with the plugging slurry through holes made by the perforation treatment in the sheet to form the plugging portions.

2. The manufacturing method of the plugged honeycomb structure according to claim 1, wherein the perforation treatment is performed using laser.

* * * * *